(12) United States Patent
Beck et al.

(10) Patent No.: US 8,523,148 B2
(45) Date of Patent: Sep. 3, 2013

(54) JACK ASSEMBLY

(75) Inventors: Russ Beck, Wausau, WI (US); Eric Anderson, Plover, WI (US); Joseph J. Peschmann, Plover, WI (US); Kawa-She-Quoen Okerlund, Wittenberg, WI (US); Todd Walstrom, Weston, WI (US); Todd Trowbridge, Marathon, WI (US)

(73) Assignee: Cequent Trailer Products, Inc., Mosinee, WI (US)

( * ) Notice: Subject to any disclaimer, the term of this patent is extended or adjusted under 35 U.S.C. 154(b) by 993 days.

(21) Appl. No.: 12/218,515

(22) Filed: Jul. 16, 2008

(65) Prior Publication Data

US 2009/0057633 A1 Mar. 5, 2009

Related U.S. Application Data

(60) Provisional application No. 60/959,718, filed on Jul. 16, 2007.

(51) Int. Cl.
*B66F 3/36* (2006.01)
*B60S 9/02* (2006.01)
*B60S 9/14* (2006.01)
*B60D 1/66* (2006.01)
*B60D 1/46* (2006.01)

(52) U.S. Cl.
USPC ............ 254/420; 254/100; 254/425; 280/475

(58) Field of Classification Search
USPC ................. 254/420, 425, 419, 100; 280/475, 280/414.1, 490.1
See application file for complete search history.

(56) References Cited

U.S. PATENT DOCUMENTS

| | | | | |
|---|---|---|---|---|
| 2,159,395 | A | * | 5/1939 | Mersereau .................... 254/420 |
| 2,205,436 | A | * | 6/1940 | Richards ....................... 254/420 |
| 2,638,315 | A | * | 5/1953 | Wagner ......................... 254/420 |
| 2,939,679 | A | | 6/1960 | Ryan |
| 3,064,944 | A | * | 11/1962 | Dalton .......................... 254/419 |
| 3,106,382 | A | * | 10/1963 | Georgi ......................... 254/419 |

(Continued)

FOREIGN PATENT DOCUMENTS

| | | |
|---|---|---|
| DE | 3938024 | 5/1991 |
| GB | 2348289 | 9/2000 |
| WO | 03057516 | 7/2003 |

OTHER PUBLICATIONS

Supplementary European Search Report, Cequent Trailer Products, Mar. 3, 2011.

(Continued)

*Primary Examiner* — Lee D Wilson
*Assistant Examiner* — Alvin Grant
(74) *Attorney, Agent, or Firm* — McDonald Hopkins, LLC

(57) ABSTRACT

An improved jack assembly for use with a trailer tongue of a towed vehicle. The jack assembly including telescoping height adjustment of the assembly, a pivot assembly for pivoting between a vertical and horizontal stowed position, and a clip for maintaining a handle assembly in a stowed position when not in use. The jack assembly also includes the use of bushings for the telescoping tubes to enhance the sliding movement between the tubes and aid in maintaining the axial alignment of the tubes thereby extending the life of the jack assembly. The pivot assembly further includes an attachment bracket that may be rotated to accommodate at least two different sizes of trailer tongues.

27 Claims, 18 Drawing Sheets

(56) References Cited

U.S. PATENT DOCUMENTS

| | | | | |
|---|---|---|---|---|
| 3,314,692 | A * | 4/1967 | Karns | 280/475 |
| 3,764,109 | A * | 10/1973 | Hollis, Jr. | 254/420 |
| 3,837,127 | A * | 9/1974 | McMichael et al. | 52/126.7 |
| 3,851,855 | A * | 12/1974 | Douglass | 254/420 |
| 3,870,278 | A * | 3/1975 | Lee | 254/98 |
| 3,921,958 | A * | 11/1975 | Brockelsby et al. | 254/420 |
| 4,265,429 | A * | 5/1981 | Formhals | 254/100 |
| 4,316,601 | A * | 2/1982 | Osborne et al. | 254/424 |
| 4,623,125 | A * | 11/1986 | Ebey | 254/420 |
| 4,662,610 | A * | 5/1987 | Cofer | 254/420 |
| 4,796,864 | A * | 1/1989 | Wilson | 254/425 |
| 4,860,841 | A * | 8/1989 | Sacco | 180/13 |
| 5,024,465 | A * | 6/1991 | Baiker | 280/6.154 |
| 5,067,692 | A * | 11/1991 | Nudd et al. | 254/420 |
| 5,273,256 | A * | 12/1993 | Chambers | 254/45 |
| 5,282,605 | A * | 2/1994 | Sauber | 254/420 |
| 5,295,703 | A | 3/1994 | White | |
| 5,553,825 | A * | 9/1996 | Rasmussen | 248/354.3 |
| 5,813,687 | A * | 9/1998 | Lay et al. | 280/414.1 |
| 5,855,360 | A * | 1/1999 | Wurdack | 254/100 |
| 5,980,217 | A * | 11/1999 | Swartz et al. | 417/234 |
| 6,213,491 | B1 * | 4/2001 | Southard, Jr. | 280/475 |
| 6,302,381 | B1 * | 10/2001 | Roll | 254/425 |
| D476,461 | S * | 6/2003 | Dries | D34/31 |
| 6,926,261 | B1 * | 8/2005 | Renshaw | 254/420 |
| 6,964,411 | B2 * | 11/2005 | Pooschen | 267/64.11 |
| 7,219,914 | B2 * | 5/2007 | Huddleston | 280/475 |
| 7,270,345 | B2 * | 9/2007 | Goettker | 280/763.1 |
| 7,296,779 | B2 * | 11/2007 | Bakshi et al. | 248/677 |
| D568,575 | S * | 5/2008 | Walstrom et al. | D34/35 |
| D577,175 | S * | 9/2008 | Walstrom et al. | D34/35 |
| 7,425,015 | B1 * | 9/2008 | Schipman | 280/490.1 |
| 7,451,841 | B2 * | 11/2008 | Nelson | 180/13 |
| D595,922 | S * | 7/2009 | Walstrom et al. | D34/35 |
| 7,574,965 | B2 * | 8/2009 | Scherrer et al. | 108/147.19 |
| 7,621,356 | B2 * | 11/2009 | Quarberg | 180/12 |
| 7,854,416 | B2 * | 12/2010 | Chen et al. | 248/161 |
| 2002/0116881 | A1 | 8/2002 | Zimmerman | |
| 2007/0075538 | A1 | 4/2007 | Goettker | |

OTHER PUBLICATIONS

Int'l Search/Written Opin, Jul. 7, 20089, Cequent Trailer Products.

* cited by examiner

JACK ASSEMBLY

CROSS-REFERENCE TO RELATED APPLICATIONS

This application claims benefit from U.S. Provisional Patent Application No. 60/959,718, entitled "Jack Assembly," filed on Jul. 16, 2007, which is hereby incorporated in its entirety by reference.

FIELD OF THE INVENTION

The present invention relates generally to jack assemblies and, more particularly, to improvements to jack assemblies.

BACKGROUND OF THE INVENTION

Jacks and jack assemblies have long been used with towing trailers. Typically, a jack assembly is secured to a towing trailer and assists in stabilizing a towing trailer while the trailer is detached from a towing vehicle. In addition, a jack assembly often assists in engaging a towing trailer with a towing vehicle or disengaging a towing trailer from a towing vehicle. A jack assembly may be utilized to maintain a towing trailer in a level position when the trailer is disengaged from a towing vehicle by elevate one end of the trailer off the ground. A jack assembly may also be utilized to change the vertical position or height of the tongue of a trailer as the tongue is mounted onto or dismounted from the hitch of a towing vehicle. Such jack assemblies are commonly pivotally mounted onto the trailer tongue so as to be pivotally moveable between a vertical position and a horizontal position. The horizontal position often allows the jack assembly to be stowed when the jack assembly is not in use.

SUMMARY OF THE INVENTION

The invention generally relates to a jack assembly for a towed vehicle. The jack assembly may include an inner tube and an outer tube, where the outer tube is capable of telescopic movement along the inner tube. The outer tube may include a slot that runs the length of the outer tube. The jack assembly may also include a bushing that may be positioned between the inner tube and the outer tube such that a portion of the bushing is positioned between the tubes so that the tubes do not touch one another. In addition, the jack assembly may include a jackscrew, a gear housing, handle assembly, a pivot assembly, and a wheel assembly. The jackscrew may be located within the inner tube that is operatively connected to a jack nut that is attached to the bushing. The gear assembly may be located adjacent the upper tend of the inner tube or outer tube. The handle assembly may be connected to the gear housing, where rotation of the handle assembly causes the outer tube to move telescopically along the inner tube. The pivot assembly may be slidably connected to the outer tube by a slide block that is rotatably connected to a pivot block, where the pivot assembly also includes a pivot housing and an attachment bracket for mounting to a trailer tongue.

DESCRIPTION OF THE DRAWINGS

Operation of the invention may be better understood by reference to the following detailed description taken in connection with the following illustrations, wherein.

DETAILED DESCRIPTION

While the present invention is described with reference to embodiments described herein, it should be clear that the present invention should not be limited to such embodiments. Therefore, the description of the embodiments herein is only illustrative of the present invention and should not limit the scope of the invention as claimed.

Figure 1:
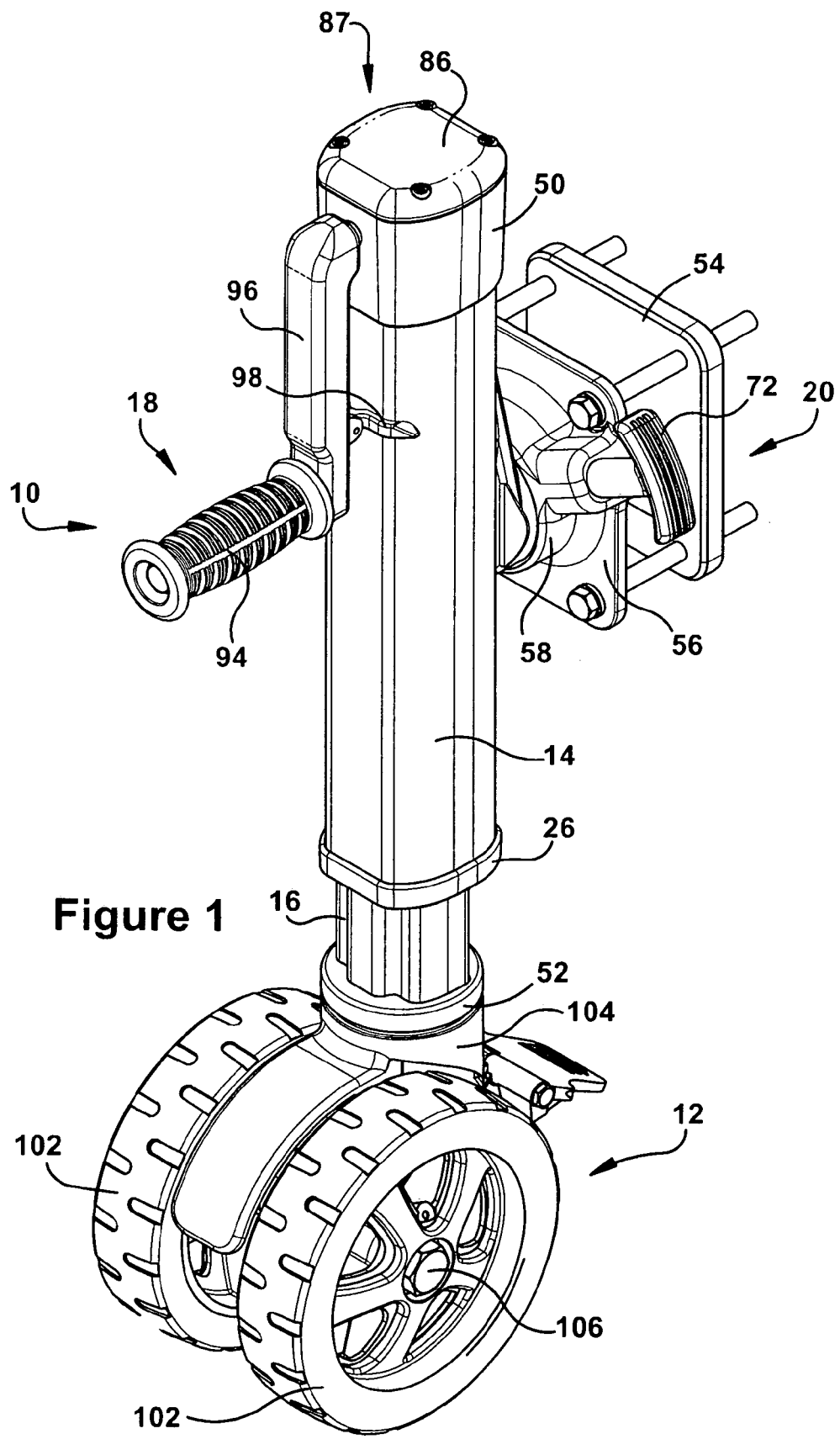
FIG. 1 illustrates a perspective view of an embodiment of a jack assembly with a dual wheel caster assembly.
Figure 2:
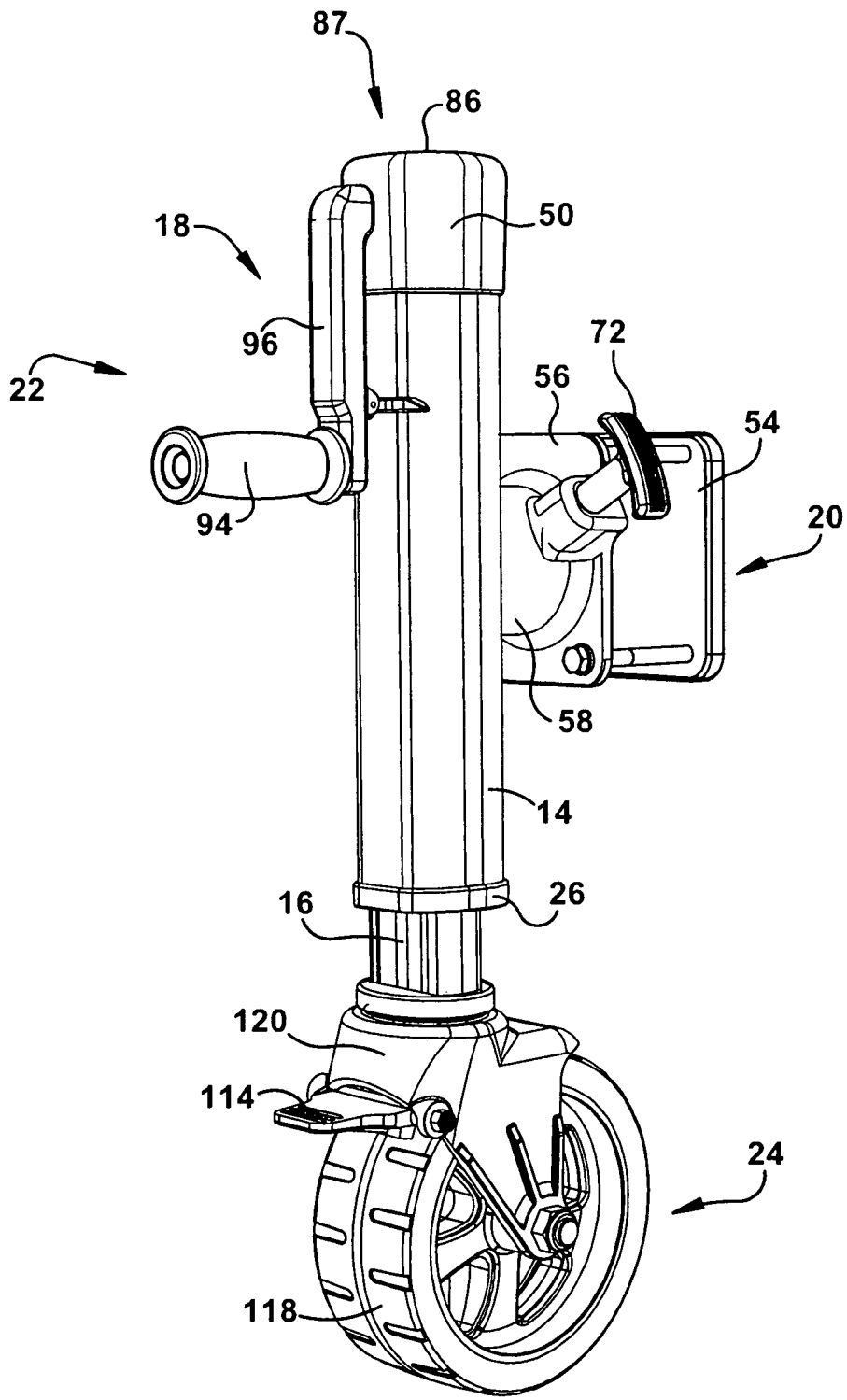
FIG. 2 illustrates a perspective view of an embodiment of a jack assembly with a single wheel caster assembly.

FIGS. 1 through 19 illustrate jack assemblies that include a number of novel improvements over jack assemblies currently known in the art. For example, FIG. 1 illustrates a perspective view of an exemplary embodiment of a jack assembly 10. The jack assembly 10 includes a dual wheel caster assembly 12, an outer tube 14, an inner tube 16, a handle assembly 18, and a pivot assembly 20. FIG. 2 illustrates another exemplary embodiment of a jack assembly 22. The embodiment illustrated in FIG. 2 is substantially similar to the embodiment illustrated in FIG. 1, with the exception of the jack assembly 22 including a single wheel caster assembly 24 in place of a dual wheel caster assembly 12. Throughout this detailed description, reference will be made to jack assemblies 10, 22. With the exception of the caster assemblies 12, 24, the descriptions of the components and functionality of jack assemblies apply equally to jack assemblies 10 with dual wheel caster assemblies 12 and jack assemblies 22 with single wheel caster assemblies 24.

Figure 3:
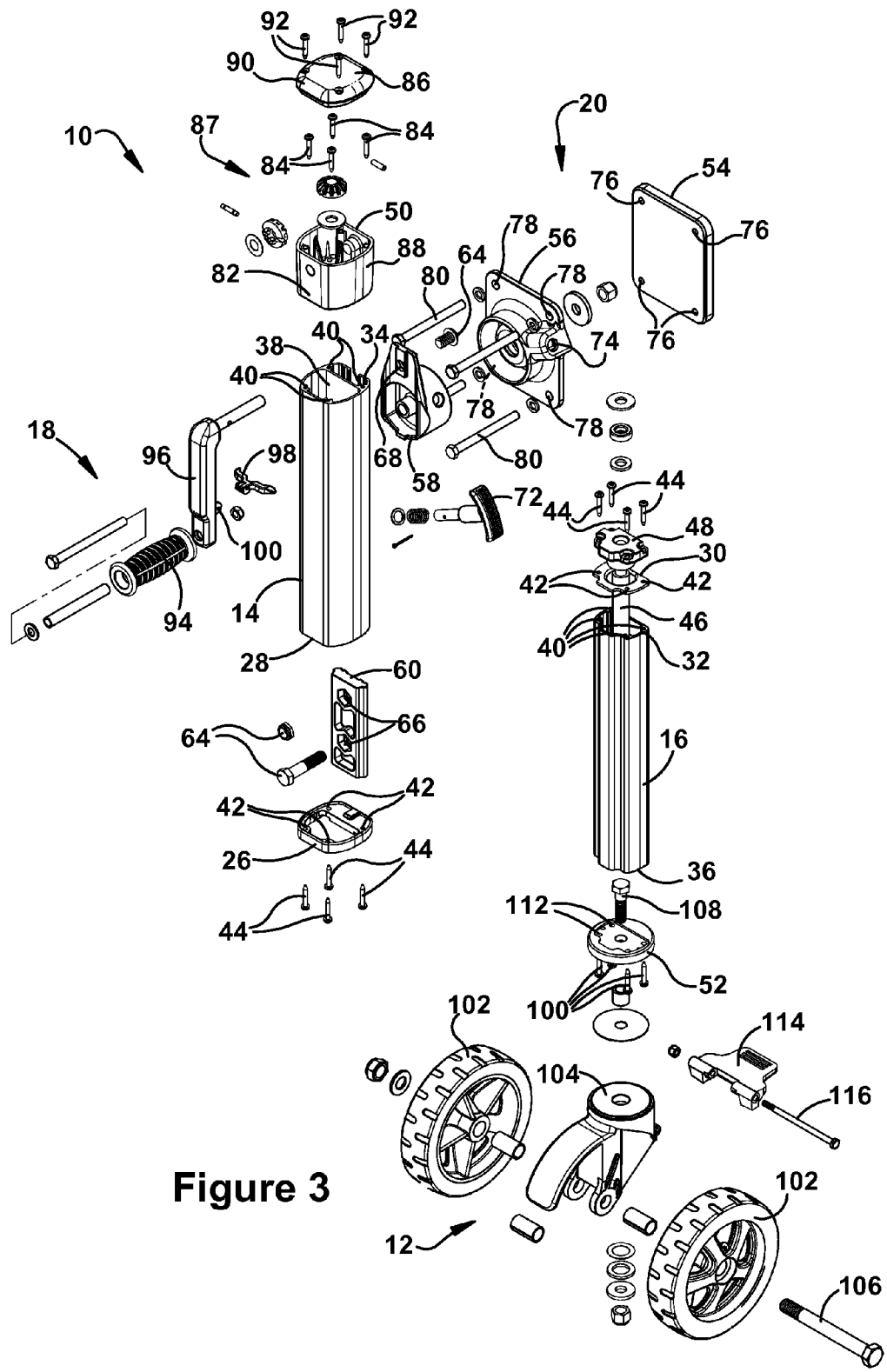
FIG. 3 illustrates an exploded view of an embodiment of a jack assembly with a dual wheel caster assembly.

FIG. 3 illustrates an exploded view of the jack assembly 10 with a dual wheel caster assembly 12. The jack assembly 10 is arranged such that the inner tube 16 is assembled at least partially within the outer tube 14, and the outer tube 14 is capable of telescopic movement along the inner tube 16. Generally, telescopic movement of the outer tube 14 relative to the inner tube 16 allows for adjustment of the height of the jack assembly 10. Typically, a user of the jack assembly 10 may want to alter the height of the jack assembly 10 to support a detached trailer in a level position. A user may also want to adjust the height of the jack assembly 10 to facilitate mounting and dismounting of a trailer to a towing vehicle.

The jack assembly 10 may be arranged such that the height of the jack assembly 10 may be increased or decreased either manually or automatically. In one embodiment, the handle assembly 18 is arranged such that the rotation of the handle assembly 18 causes the outer tube 14 to move telescopically along the inner tube 16.

To facilitate relative movement of the outer tube 14 and inner tube 16, a bushing may be positioned between the tubes 14, 16. In one embodiment, an outer tube bushing 26 may be secured to a lower end 28 of the outer tube 14 such that a portion of the bushing 26 is positioned between the tubes 14, 16 to prevent direct contact between the tubes 14, 16. In another embodiment, an inner tube bushing 30 may be secured to an upper end 32 of the inner tube 16 such that a portion of the bushing 30 is positioned between the tubes 14, 16 to prevent direct contact between the tubes 14, 16. It will be appreciated by those skilled in the art that a bushing may be secured to an upper end 34 of the outer tube 14 or secured to a lower end 36 of the inner tube 16 to prevent direct contact of the tubes 14, 16.

Figure 4:
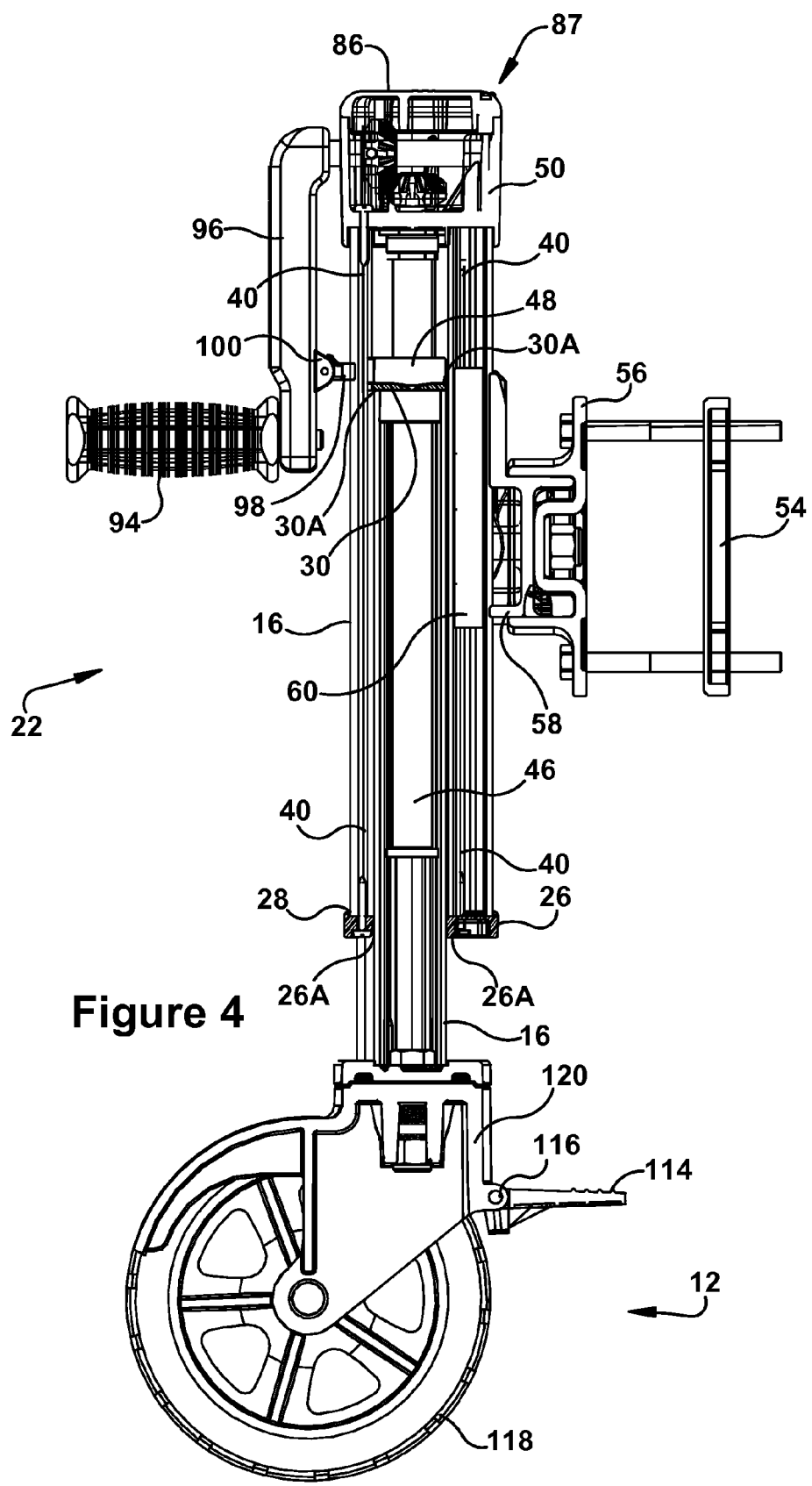
FIG. 4 illustrates a cross-sectional view of a jack assembly with a single wheel caster assembly.

It will also be appreciated that a plurality of bushings may be secured to the tubes 14, 16 to prevent direct contact between the tubes 14, 16 and to facilitate relative movement of the tubes 14, 16. In one embodiment (as best seen in FIG. 4), an outer tube bushing 26 is secured to the lower end 28 of the outer tube 14 and an inner tube bushing 30 is secured to the upper end 32 of the inner tube 16. The outer tube bushing 26 includes an opening 37 to accommodate the inner tube 16 so that the inner tube 16 may be assembled within the outer tube 14. In such an embodiment, the bushings 26, 30 are arranged so as to be in contact with the tubes 14, 16 such that the tubes 14, 16 do not directly contact each other while experiencing relative movement.

Figure 5:
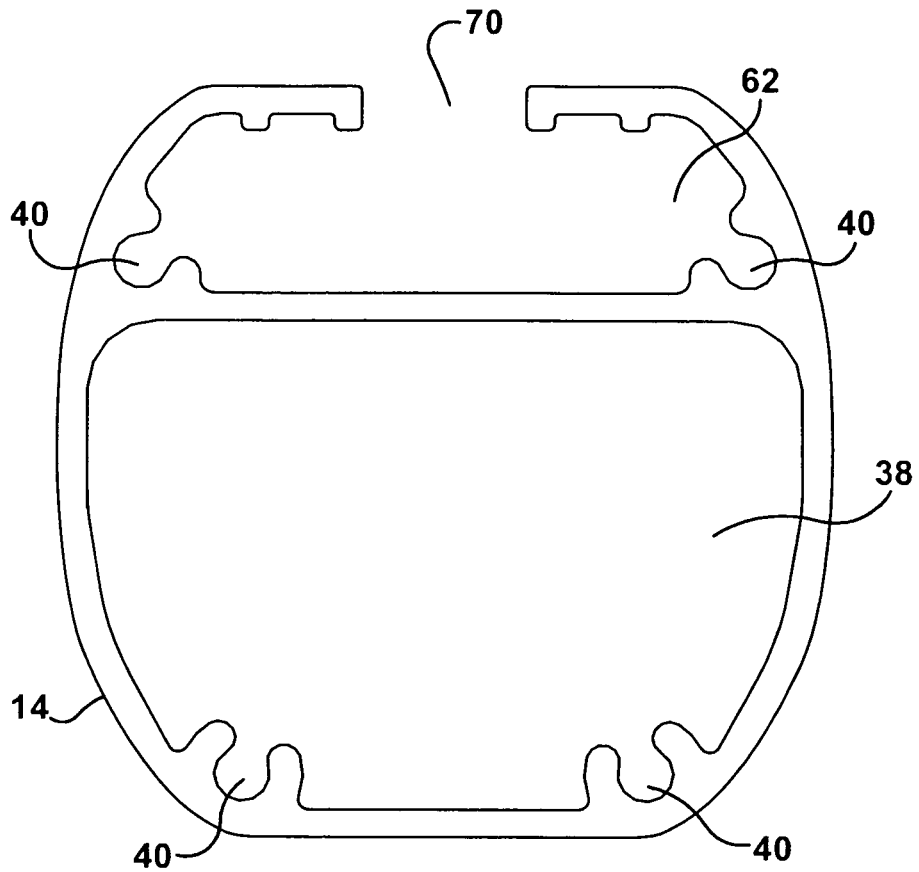
FIG. 5 illustrates a cross-sectional view of an outer tube of a jack assembly.
Figure 6:
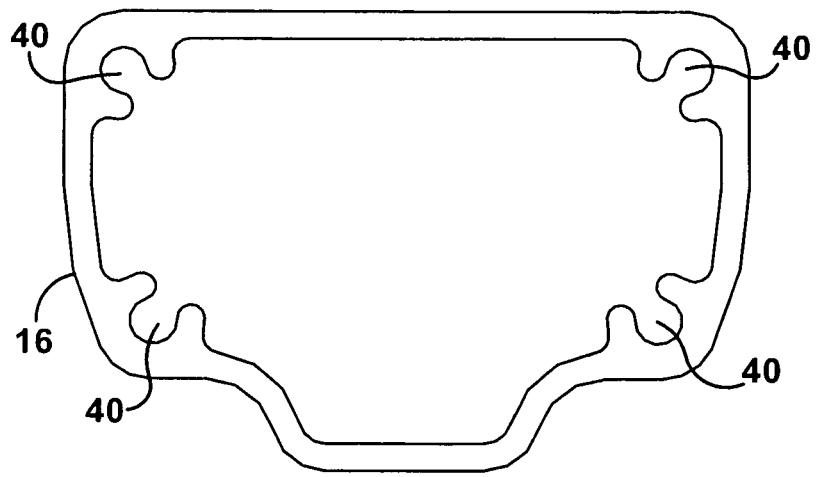
FIG. 6 illustrates a cross-sectional view of an inner tube of a jack assembly.
Figure 7:
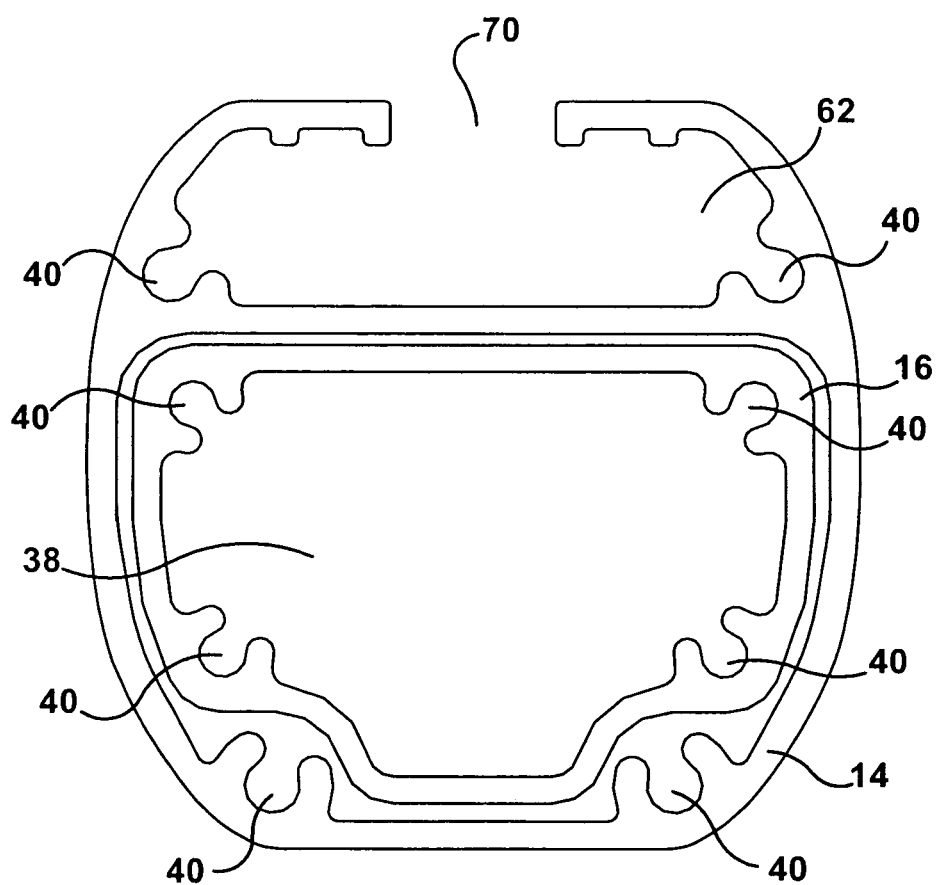
FIG. 7 illustrates a cross-sectional view of an inner tube positioned within an outer tube of a jack assembly.
Figure 8A:
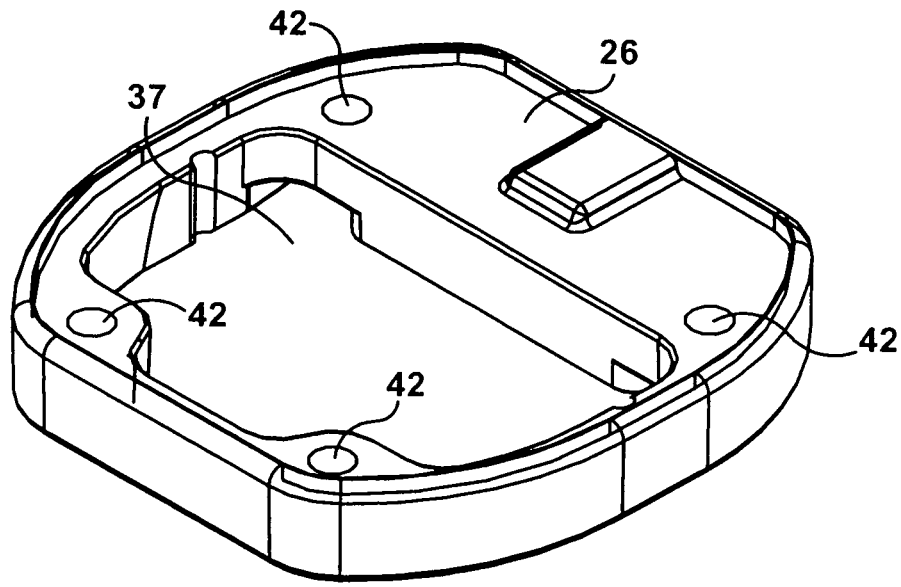
FIG. 8A illustrates a perspective view of an outer tube bushing of a jack assembly.
Figure 8B:
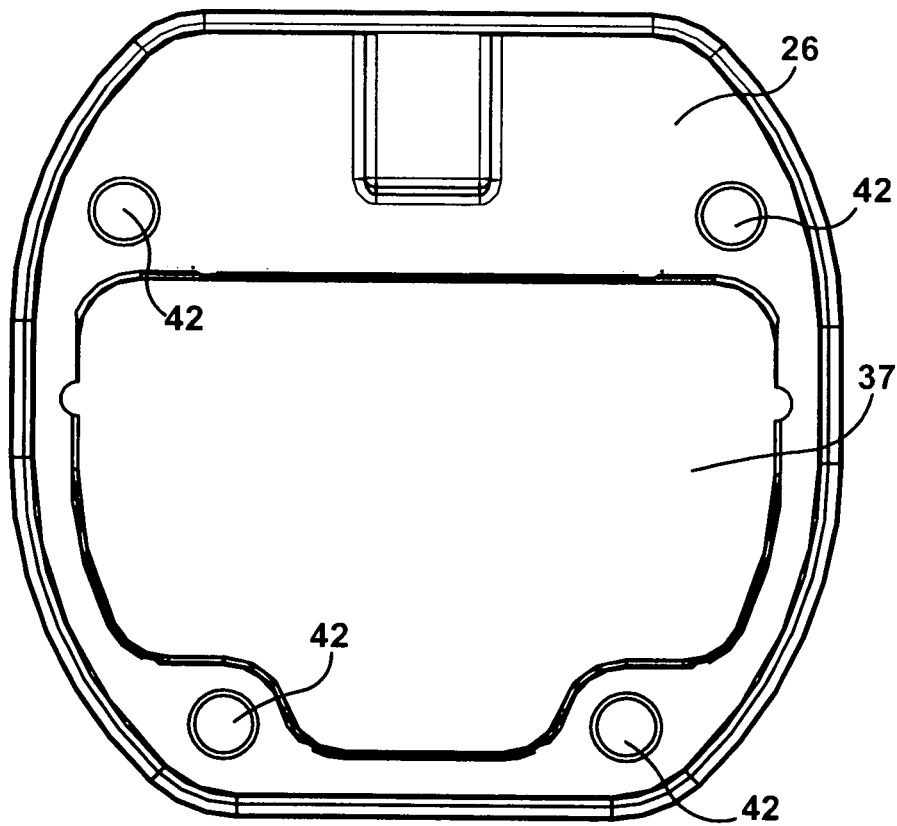
FIG. 8B illustrates a topside view of an outer tube bushing of a jack assembly.
Figure 9A:
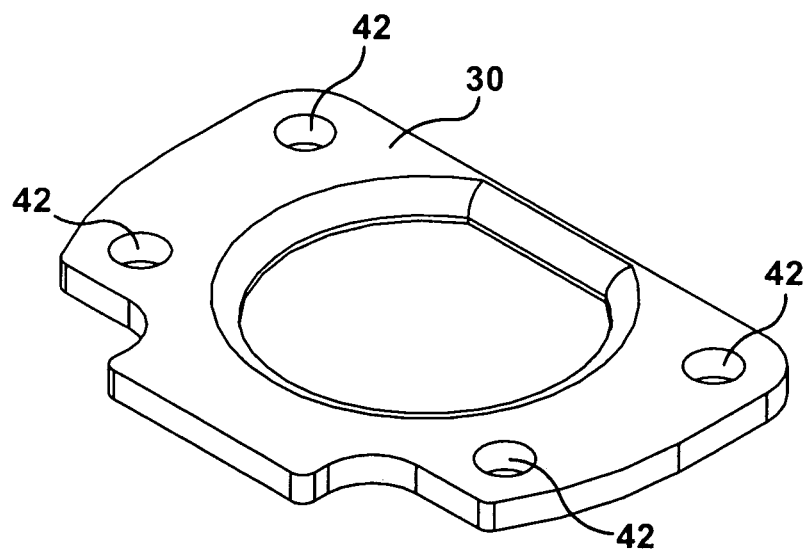
FIG. 9A illustrates a perspective view of an inner tube bushing of a jack assembly.
Figure 9B:
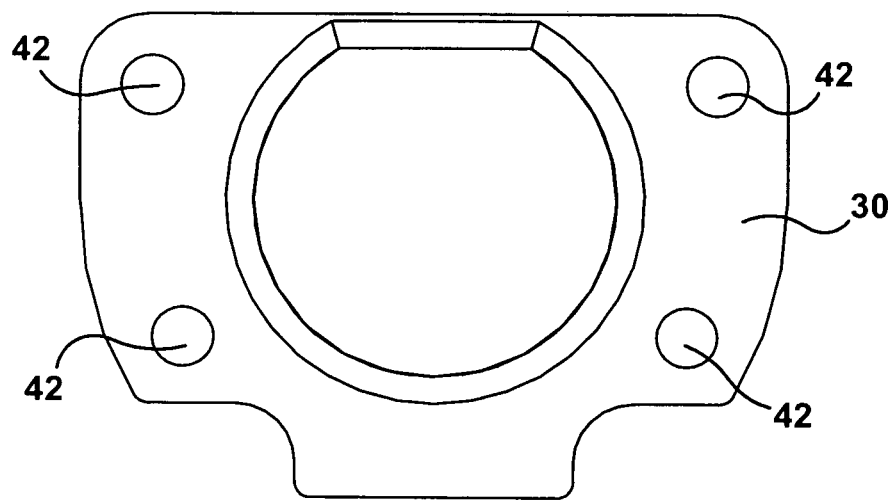
FIG. 9B illustrates a topside view of an outer tube bushing of a jack assembly.

FIG. 5 illustrates a cross-sectional view of the outer tube 14; FIG. 6 illustrates a cross-sectional view of the inner tube 16; FIG. 7 illustrates a cross-sectional view of the inner tube 16 assembled within the outer tube 14; FIG. 8A illustrates a perspective view of an outer tube bushing 26; FIG. 8B illustrates a topside view of an outer tube bushing 26; FIG. 9A illustrates a perspective view of an inner tube bushing 30; and FIG. 9B illustrates a topside view of an inner tube bushing 30. As best seen in FIGS. 5, 6, and 7, the outer tube 14 includes a passage or chamber 38 shaped and sized to accept the inner tube 16 and to allow the inner tube 16 and outer tube 14 to slide relative to each other. The outer tube 14 and inner tube 16 include a plurality of apertures 40 that run the length of the tubes 14, 16 (as best seen in FIG. 4). Optionally, apertures may be limited to the ends of the tubes 14, 16. The apertures 40 are sized and shaped to accommodate fasteners such as screws, bolts, rivets, and the like. In one embodiment, the apertures 40 are bosses formed by a process of extruding the tubes 14, 16.

As best seen in FIGS. 8A, 8B, 9A, and 9B, the bushings 26, 30 may be arranged to also include apertures 42. The apertures 42 of the outer tube bushing 26 may be arranged to coincide with the apertures 40 of the outer tube 14. Similarly, the apertures 42 of the inner tube bushing 30 may be arranged to coincide with the apertures 40 of the inner tube 16. In such arrangements, fasteners 44, such as screws, may be passed through the bushing apertures 42 and secured in the tube apertures 40 to secure an outer tube bushing 26 to an outer tube 14 or to secure an inner tube bushing 30 to an inner tube 16. As best seen in FIG. 4, securing a bushing 26, 30 to a tube 14, 16 in such a manner results in a portion 26A of the outer tube bushing 26 or a portion 30A of the inner tube bushing 30A being positioned between the outer 14 and inner tubes 16. Such positioning prevents direct contact between the tubes 14, 16 as the tubes 14, 16 move relative to each other. As will be subsequently described, such positioning of the bushings 26, 30 facilitates enhanced sliding movement between the tubes 14, 16.

In one embodiment, securing the bushings 26, 30 to the tubes 14, 16 assists in maintaining axial alignment of the tubes 14, 16. Alignment may be maintained by minimizing the tolerance or play between the bushings 26, 30 and the tubes 14, 16. Maintaining axial alignment of the tubes 14, 16 may limit or prevent binding or galling of the tubes 14, 16 as they move relative to one another. Preventing or limiting galling of the tubes 14, 16, in turn, prevents or limits damage to any coating or finish applied to the surface of the tubes 14, 16. In addition, maintaining alignment of the tubes 14, 16 reduces the mechanical effort needed to slide the tubes 14, 16 relative to one another. Such a reduction in mechanical effort results in a jack assembly 10 that is easier to operate and also limits wear and tear on mechanical components within the jack assembly 10.

As previously described, the handle assembly 18 may be arranged such that rotation of the handle assembly 18 causes the outer tube 14 to move relative to the inner tube 16. As best seen in FIGS. 3 and 4, the handle assembly 18 is generally coupled to a mechanism that rotates a jackscrew 46 as the handle assembly 18 is rotated. A jack nut 48 is positioned on the jackscrew 46 and is in contact with either the outer or inner tube 14, 16. As the jackscrew 46 rotates, the jack nut 48 moves along the jackscrew 46 to facilitate the sliding or moving of the outer tube 14 relative to the inner tube 16. The axial alignment of the tubes 14, 16, which may be maintained by the bushings 26, 30, also prevents or limits binding or galling of the jackscrew 46 and jack nut 48. In addition, maintaining axial alignment also limits or prevents galling of the tubes 14, 16 by either the jackscrew 46 or the jack nut 48. The elimination of galling by the jackscrew 46 and the jack nut 48 and the reduction of mechanical effort needed to move the jack assembly 10 generally results in an extended service life for the jackscrew 46 and nut 48, as well as an extended service life of a number of other mechanical components of the jack assembly 10.

In securing a bushing 26, 30 to an end of a tube 14, 16, the bushing 26, 30 may serve to cover any sharp edges of the tube ends. The tubes 14, 16 may be manufactured or fabricated from metals, such as aluminum, steel, and the like. The tubes 14, 16 may be manufactured or fabricated by a variety of processes, such as extrusion, casting, forging, and the like. Such processes may result in sharp or burred edges that may necessitate post-fabrication processes to deburr or dull the edges. The bushings 26, 30 are arranged such that, once they are secured to an end of a tube 14, 16, the bushing 26, 30 covers any sharp edges, burrs, or other features that may cause damage to the jack assembly 10 of other articles near the jack assembly 10, thus eliminating post-fabrication operations and reducing manufacturing costs.

In one embodiment, the bushings 26, 30 are manufactured or fabricated from a plastic or other such polymeric material. For example, the bushings 26, 30 may be fabricated using a glass-reinforced nylon. In another example, the bushings 26, 30 may be fabricated using a polyoxymethylene or other such polyacetal. The bushings 26, 30 may be molded and secured to the tubes 14, 16 with fasteners 44 as described above or, in one alternative, the bushings 26, 30 may be over-molded directly to the ends of the tubes 14, 16.

In addition to the bushings 26, 30, other components or objects may be secured to the ends of the outer or inner tubes 14, 16 by passing fasteners 44 through the components and securing the fasteners 44 to the apertures 40 of the tubes 14, 16. In one exemplary embodiment, best seen in FIGS. 3 and 4, a gear housing 50 may be secured to an upper end 34 of the outer tube 14. In another exemplary embodiment, a yoke retainer 52 may be secured to the lower end 36 of an inner tube 16. Such versatility of the apertures or bosses 40 of the inner and outer tubes 14, 16 results in reduced manufacturing and redesign costs, along with more reliable and robust end products.

In an embodiment, the outer tube bushing 26 is arranged to reinforce the lower end 36 of the inner tube 16 during side loading. Under certain conditions, the jack assembly 10 may experience side loads as it vertically supports a towing trailer. When the outer tube bushing 26 is secured with four screws 44 to the lower end 28 of the outer tube 14, and the opening 37 though the bushing 26 leaves little tolerance between the bushing 26 and the inner tube 16, the bushing 26 provides a stabilizing force to reinforce the inner tube 14 to counteract side loads. Fabricating the bushing 26 using rigid material, such as glass-reinforced nylon and the like, may enhance the stability of and reinforce the inner tube 16. It will be readily understood by those skilled in the art that such arrangements also stabilize and reinforce the outer tube 14 during side loading. It also will be readily understood that the inner tube bushing 30 may also be arranged to enhance the stability of and reinforce the tubes 14, 16 during side loading.

The adjustable pivot assembly 20 performs a number of functions for the jack assembly 10. For example, the pivot assembly 20 may be used to secure the assembly 10 to a trailer tongue 53 or similar member. As will be subsequently described in detail, the pivot assembly 20 may be designed to accommodate multiple sizes of trailer tongues. In another embodiment, the adjustable pivot assembly 20 may be arranged to allow the jack assembly 10 to pivot between vertical and horizontal positions once the assembly 10 is secured to a trailer tongue 53.

As best seen in FIGS. 3, 10, 11, and 12, the adjustable pivot assembly 20 generally includes an attachment bracket 54, a pivot housing 56, a pivot block 58, and a slide block 60. The pivot block 58 and the slide block 60 may be arranged so as to secure the pivot assembly 20 to the outer tube 14. The attachment bracket 54 and the pivot housing 56 may be arranged so as to secure a jack assembly 10 to a tongue 53 of a towing trailer.

As best seen in FIGS. 5 and 7, the outer tube 14 includes a slot 62 that runs the length of the tube 14. The slot 62 is sized and shaped to allow the slide block 60 to slide along the slot 62. While the slide block 60 is located in the slot 62, the pivot block 58 may be positioned along the outside of the slot 62 and secured to the slide block 60 so as to secure the blocks 58, 60 together at a given position along the slot 62. The blocks 58, 60 may be secured together by fasteners 64 passing though apertures 66 in the slide block 60 and apertures 68 in the pivot block 58. In one embodiment, the fasteners 64 may include bolts and nuts, with the bolts passing through the apertures 66, 68 and being secured with the nuts. As best seen in FIGS. 5 and 7, the slot 62 in the outer tube 14 includes an opening 70 that allows fasteners 64 to pass though the outer tube 14 when the fasteners 64 are securing the pivot block 58 to the slide block 60. It will be appreciated by those skilled in the art that, as the nuts are tightened onto the bolts, the pivot block 58 and slide block 60 are drawn together, and a clamping force is applied to the walls of the outer tube 14 such as to allow the blocks 58, 60 to maintain their position along the length of the outer tube 14. It also will be appreciated that the example of bolts and nuts is exemplary only, and the pivot block 58 may be secured to the slide block 60 using many combinations of fasteners such as rivets, screws, and the like.

The arrangement of the pivot block 58 and slide block 60 as described above allows the pivot assembly 20 to be adjusted along the length of the outer tube 14. Such adjustability allows for a versatile jack assembly 10, which may be used with and attached to a large variety of towing trailers. In one exemplary embodiment, the total travel range of the pivot assembly 20 with respect to the outer tube 14 is eighteen inches. Such a large travel range allows a jack assembly 10 to be utilized or attached to towing trailers that are designed for passenger automobiles, light trucks, heavy duty trucks, commercial trucks, etc. In addition to facilitating the use of a jack assembly 10 with a wide variety of towing trailers, the adjustability of the pivot assembly 20 also allows for precise placement of the pivot assembly 20 with respect to each of these wide varieties of towing trailers. As the pivot assembly may be placed at any location along the outer tube 14, the location of the pivot assembly 20 is not limited to a few predetermined fixed locations. Such versatility allows a user to position the height of the pivot assembly 20 at an optimal height for each towing trailer. This adjustability also allows the jack assembly to be remounted to numerous towing trailers throughout its service life.

Figure 13:
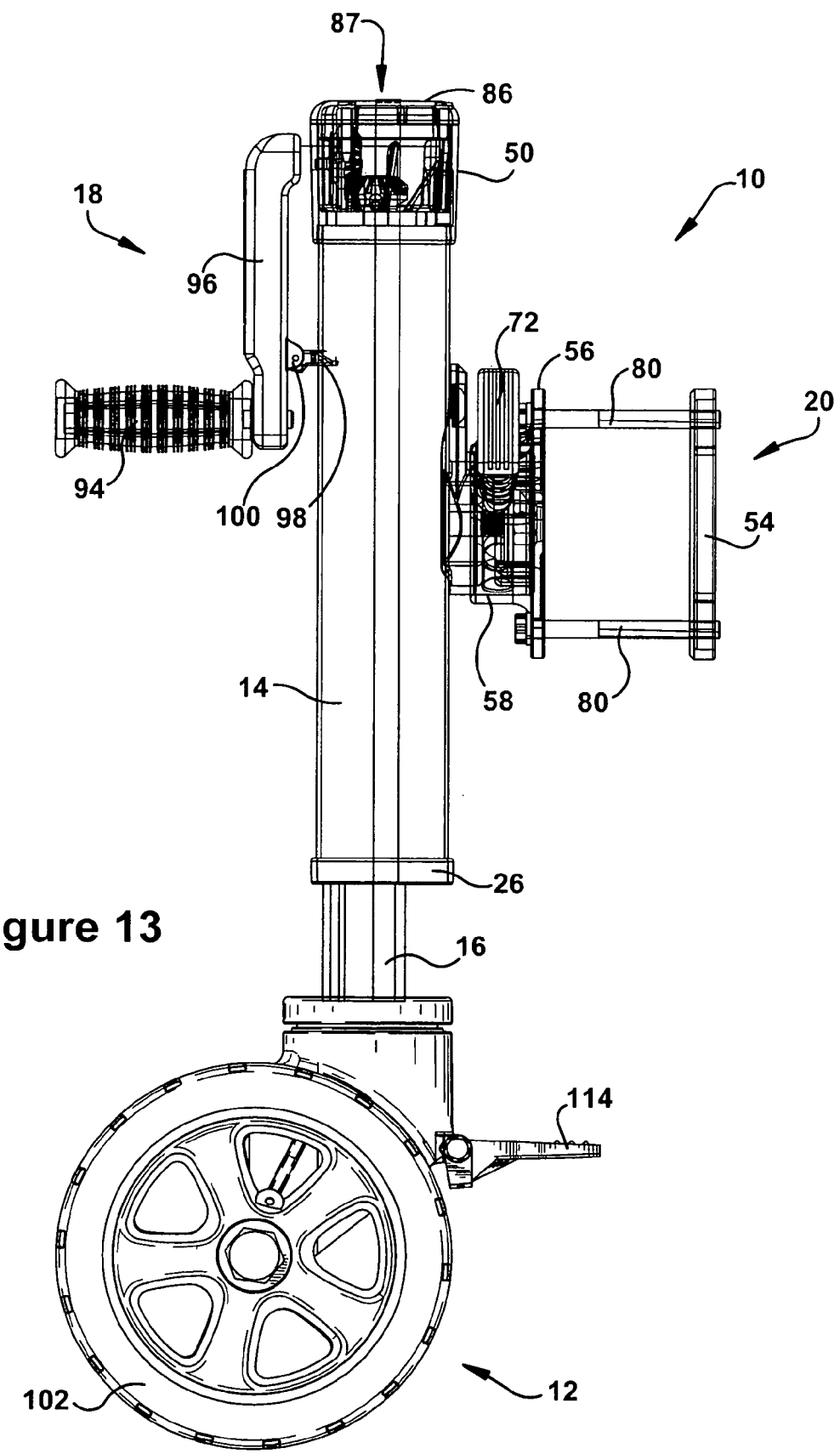
FIG. 13 illustrates a side view of a jack assembly.
Figure 14:
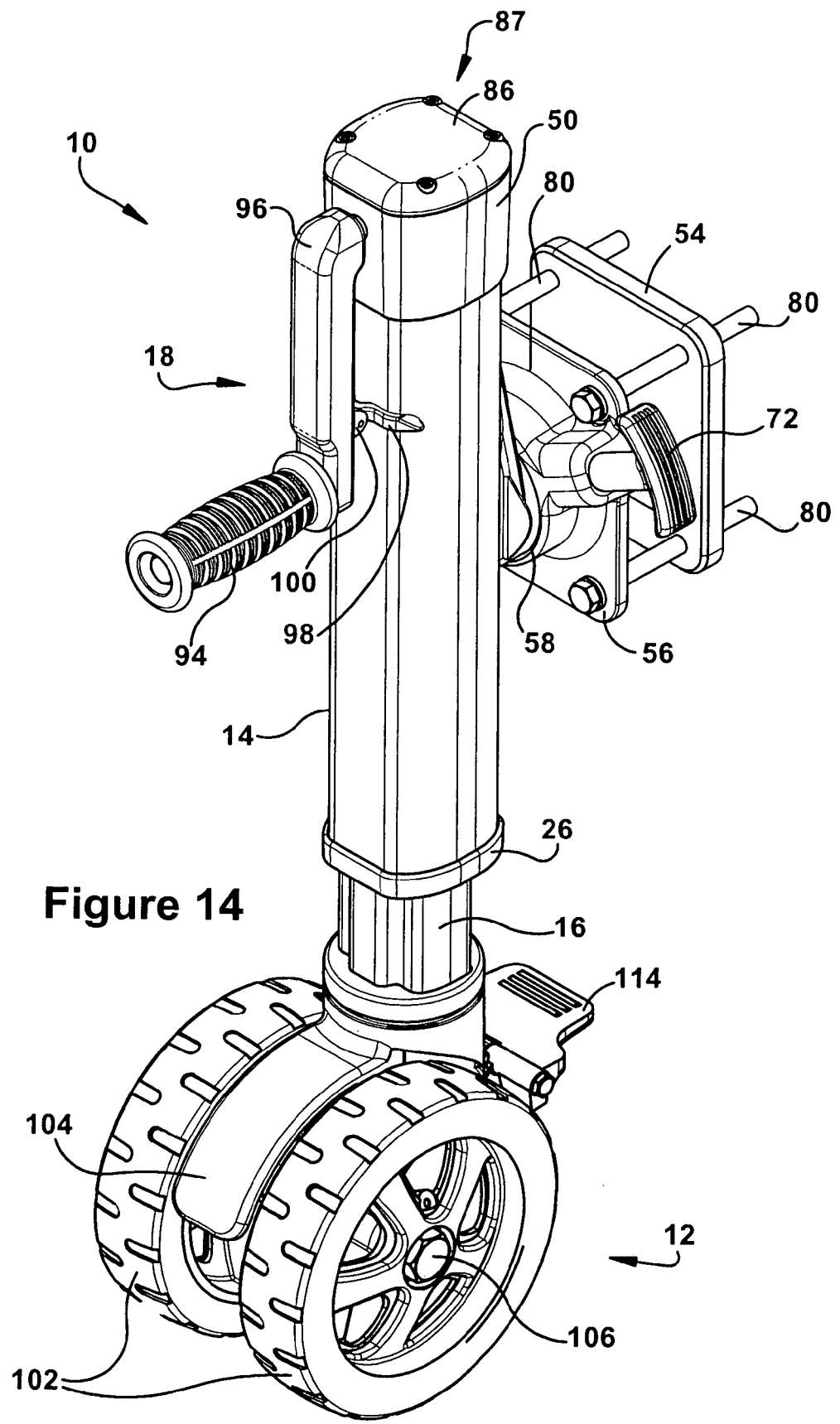
FIG. 14 illustrates a perspective view of a jack assembly.

As previously described, the attachment bracket 54 and the pivot housing 56 may be arranged to secure a jack assembly 10 to a tongue 53 of a trailer. In one embodiment, the pivot housing 56 is coupled to the pivot block 58. As best seen in FIGS. 13 and 14, the pivot housing 56 may be arranged so as to enclose or conceal all internal mechanics used to pivot the jack assembly 10 such as, for example, springs, clips, pins, etc. In one embodiment, the pivot housing 56 is a single cast component that encloses the internal pivot mechanics. The pivot housing 56 is arranged such that it may rotate relative to the pivot block 58 about a pivot axis 57. A pull pin 72 is coupled to the pivot housing 56 and is arranged to selectively lock the position of the housing 56 relative to the pivot block 58. Providing a single cast pivot housing 56 maintains the aesthetic continuity of the jack assembly 10 and creates an ergonomic system. An aperture 74 formed during the casting of the pivot housing 56 may be utilized for the pull pin 72 that is used to lock and unlock the position of the housing 56 relative to the pivot block 58. The housing 56 may be cast from steel, aluminum, or the like. The pivot pin 72 may be fabricated from high carbon steel to provide a strong and reliable pivot assembly 20. Fabricating a large diameter cast pivot block 58 may also enhance the strength and reliability of the pivot assembly 20. The cast pivot block 58 may be cast from steel, aluminum, or the like.

Figure 10:
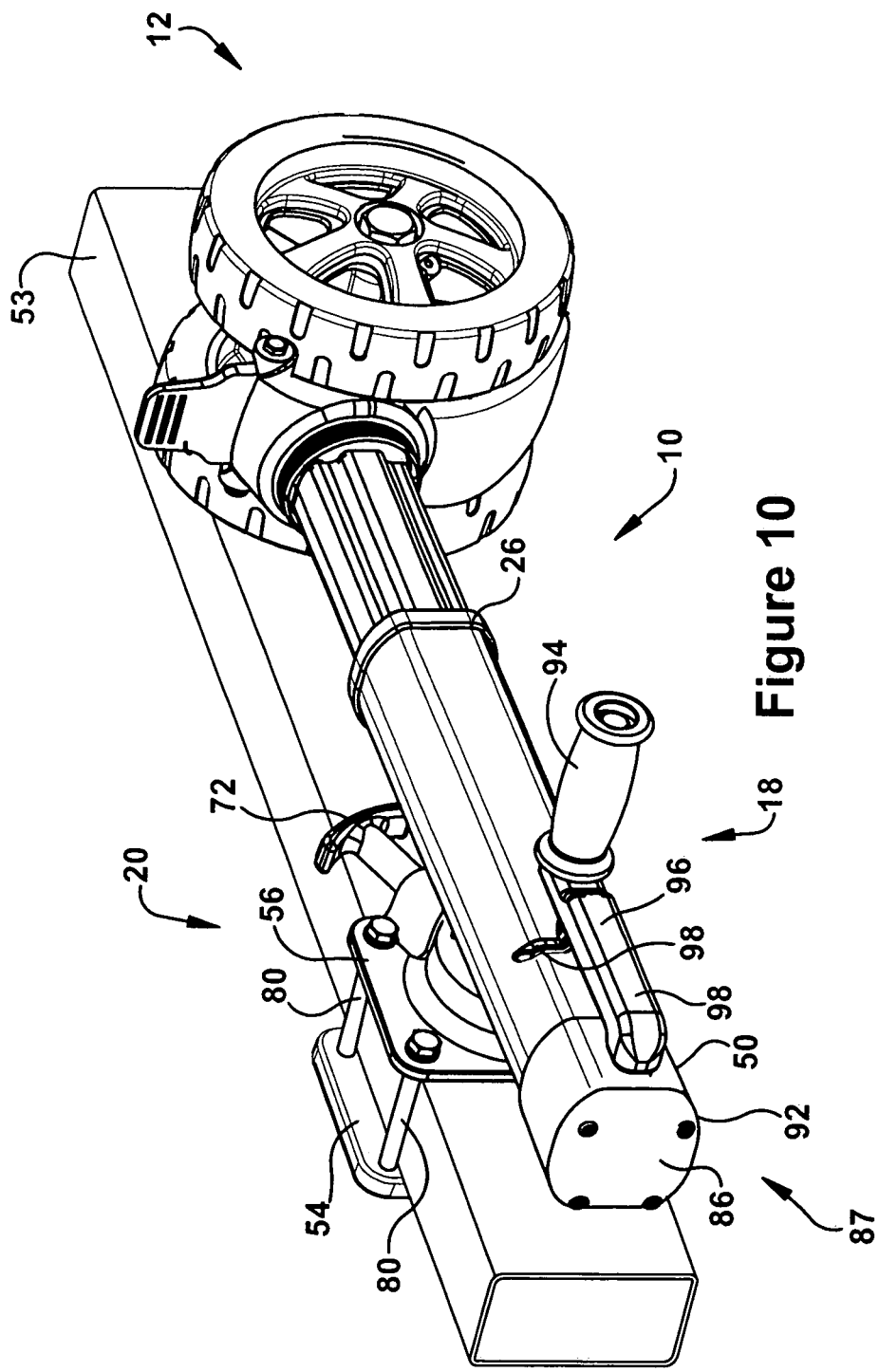
FIG. 10 illustrates a perspective view of a jack assembly attached to the tongue of a towing trailer with the jack assembly in the stowed position.
Figure 11:
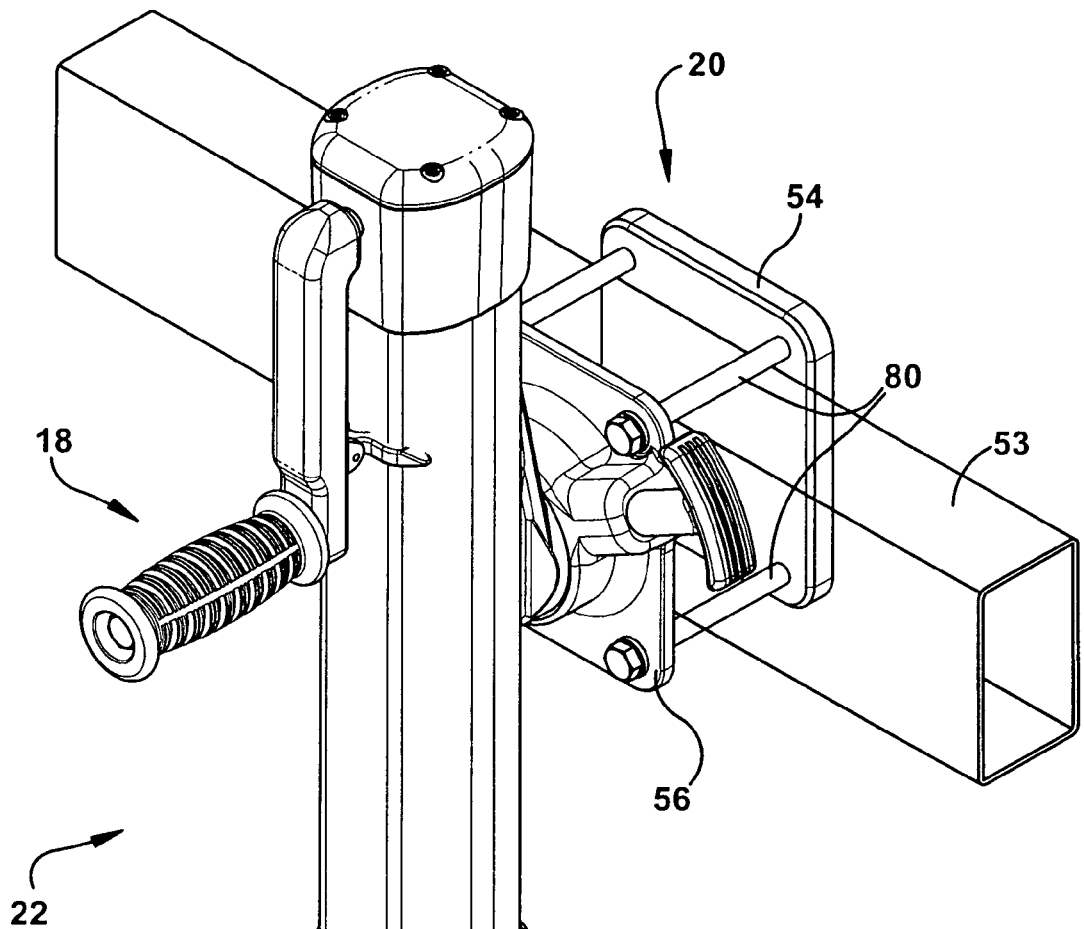
FIG. 11 illustrates a perspective view of a jack assembly attached to the tongue of a towing trailer with the jack assembly in an operational position.
Figure 12:
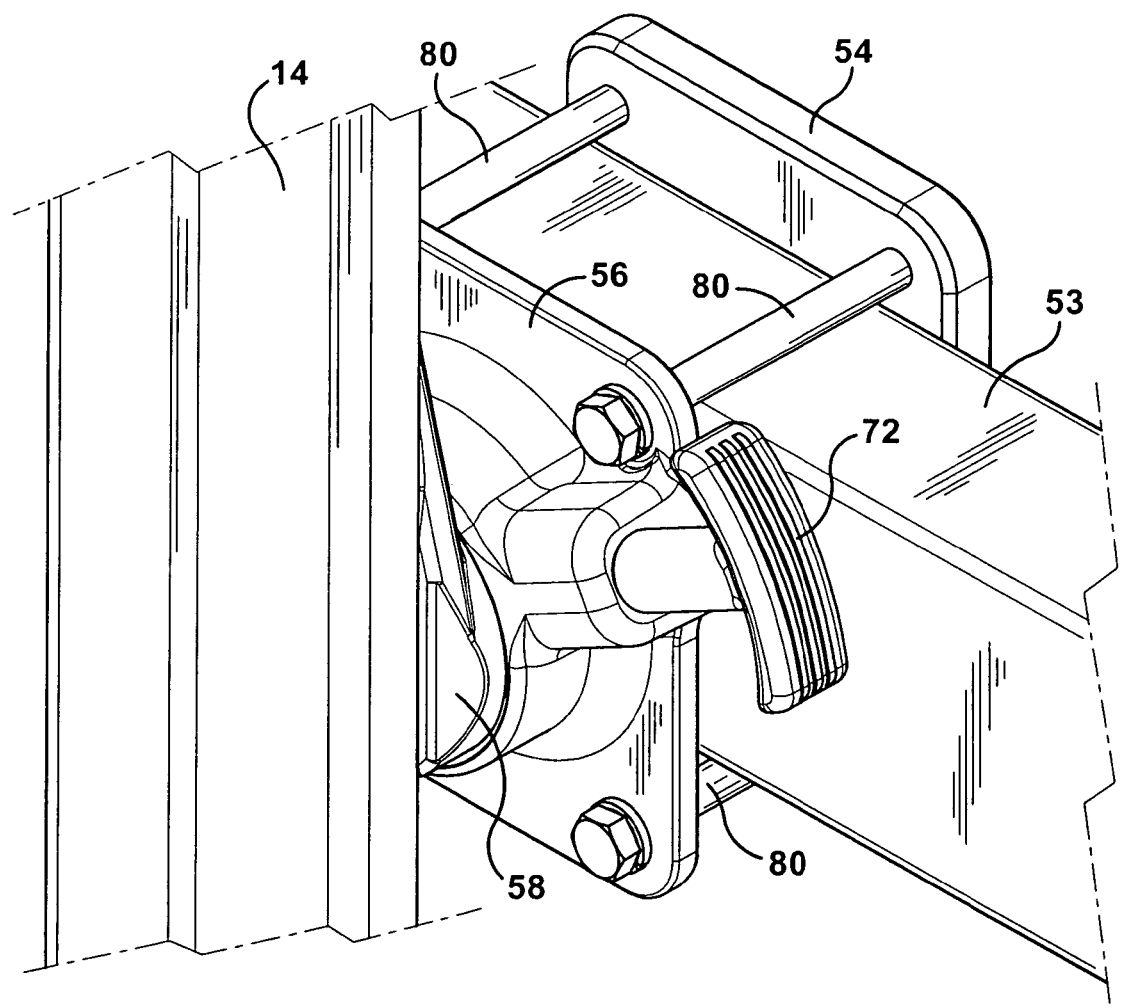
FIG. 12 illustrates a partial perspective view of a jack assembly attached to the tongue of a towing trailer with the jack assembly in an operational position.

The attachment bracket 54 includes a plurality of apertures 76, and the pivot housing 56 includes a plurality of apertures 78. The plurality of attachment bracket apertures 76 are arranged to align with the plurality of pivot housing apertures 78. As best seen in FIGS. 10, 11, and 12, the attachment bracket 54 may be positioned on one side of a towing tongue 53, and the pivot housing 56 may be positioned on the opposite side of the towing tongue 53. The apertures 76, 78 may be positioned so as to align such that fasteners 80 may be passed through the apertures 76, 78 to secure the attachment bracket 54 to the pivot housing 56. The fasteners 80 may be, for example, bolts and nuts, rivets, or the like. It will be readily understood that, as the attachment bracket 54 is secured to the pivot housing 56, the pivot assembly 20 and the jack assembly 10 are secured to the trailer tongue 53 (as best seen in FIGS. 10, 11, and 12). It also will be understood that, as the fasteners 80 are tightened, the attachment bracket 54 and the pivot housing 56 are drawn together to produce a clamping force on the trailer tongue 53 and to secure the pivot assembly 20 to the trailer tongue 53.

Figure 15:
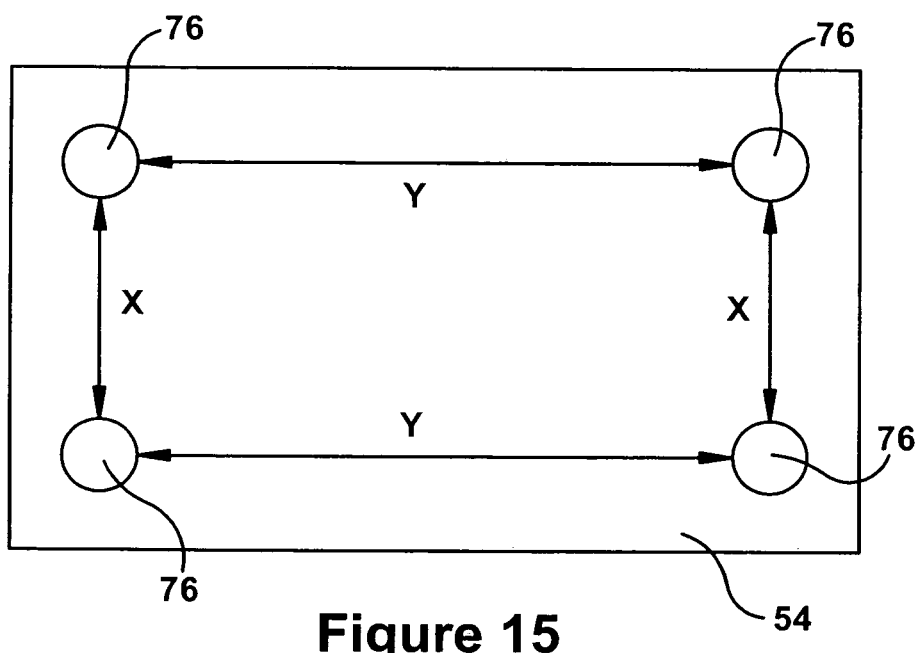
FIG. 15 illustrates a schematic view of an attachment bracket of a jack assembly.

The attachment bracket 54, as schematically illustrated in FIG. 15, is arranged to attach to a variety of trailer tongues. As may be seen from the arrangement of the apertures 76, the attachment bracket 54 may accommodate tongues of at least two different heights. The attachment bracket 54 may be secured to a tongue that has a height of X (as seen in FIG. 15) or may be rotated ninety degrees to accommodate a tongue that is the height of Y (also as seen in FIG. 15). In one embodiment, the attachment bracket 54 is arranged such that X is equal to three inches and Y is equal to four inches. In such an arrangement, fasteners 80 that are passed through the apertures 76 contact the sides of a trailer tongue 53, which are either three inches of four inches in height, to further enhance the attachment of the pivot assembly 20 to the trailer tongue 53. In one embodiment, the pivot assembly 20 may be arranged to accommodate a four-inch trailer tongue in a first position and may be rotated ninety degrees to accommodate a three-inch trailer tongue.

It will be appreciated that, in one embodiment, the pivot housing 56 may be arranged such that the pivot pin 72 rotates as the jack assembly 10 is moved from a vertical position to a horizontal stowed position. Such an arrangement would provide a user with an ergonomic access to the pull pin 72 in both the vertical and stowed positions. In addition, the positioning of the pull pin 72 creates an ergonomic arrangement by positioning the pull pin 72 such that a user pulls upward when rotating the jack assembly 10 between the vertical and stowed positions.

Figure 16:
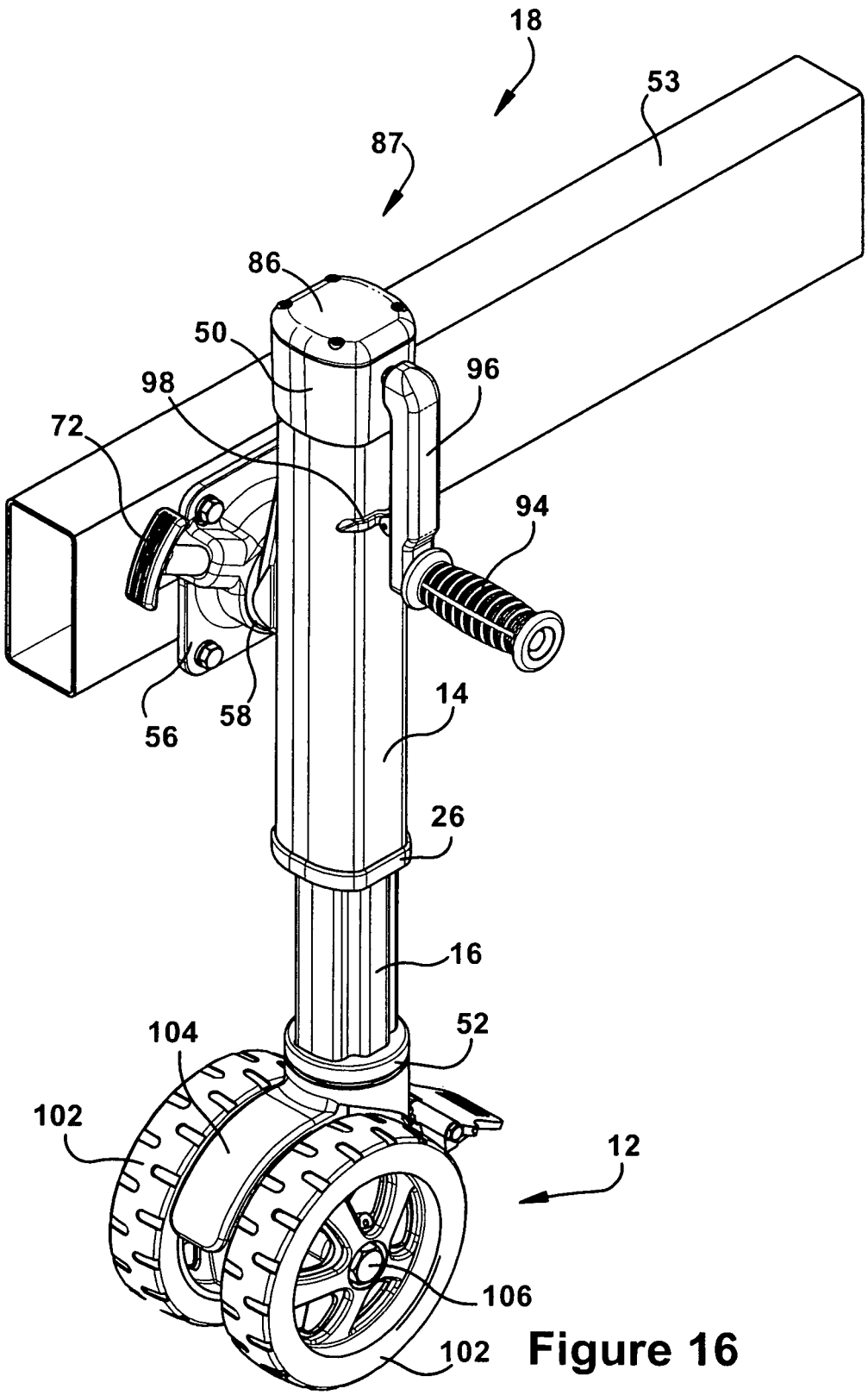
FIG. 16 illustrates a perspective view of a jack assembly welded to a tongue of a towing trailer.
Figure 17:
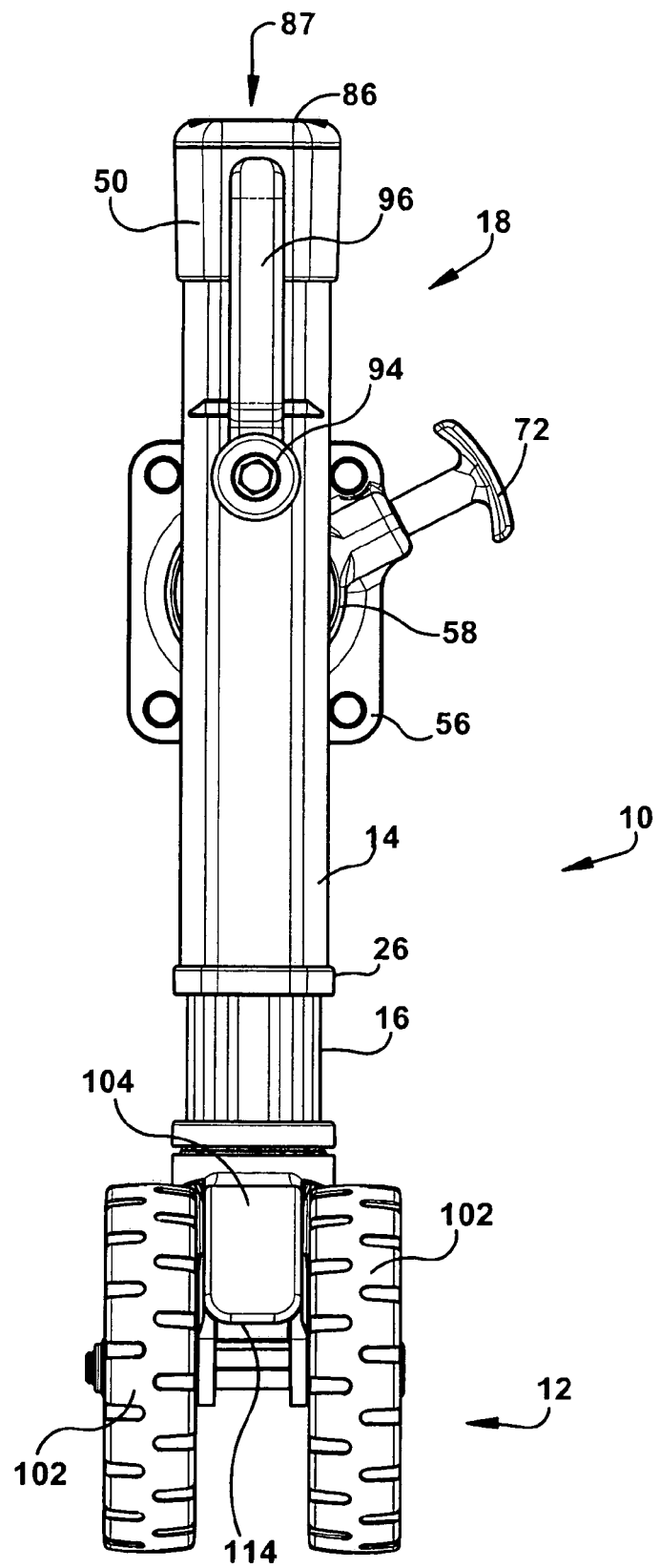
FIG. 17 illustrates a front view of a jack assembly.

In another embodiment of the jack assembly 10, as best seen in FIG. 16, the pivot housing 56 or the attachment bracket 54 may be utilized as a weld plate to weld the jack assembly 10 to a trailer tongue 53. In another embodiment, precision machining may form precise fits between mating parts. Such an arrangement minimizes movement in the pivot assembly 20, which generally increases the ease of use of the jack assembly 10, reduces wear and tear on components of the pivot assembly 20, and increases the service life of the pivot assembly 20 and the jack assembly 10.

As previously described, a gear housing 50 may be secured to an end of an outer tube 14 or an inner tube 16. In one embodiment, as best seen in FIGS. 3 and 4, a gear housing 50 is mounted or otherwise secured to the upper end 34 of the outer tube 14. Such a mounting eliminates the need for weldments, drilling, piercing, crimping, or any other secondary process to be carried out in the manufacture of the outer tube 14 to secure the gear housing 50 to the jack assembly 10. In one embodiment, the base plate 82 of the gear housing 50 includes a plurality of apertures. These apertures are arranged such that they align with the apertures or bosses 40 fabricated or extruded with the outer tube 14. The gear housing 50 may then be positioned on top of the outer tube 14, and fasteners 84 may be passed through the apertures in the base plate 82 and into the bosses 40 in the outer tube 14 so as to secure the gear housing 50 to the jack assembly 10.

In an embodiment, a gear housing cap 86 may be secured to the top portion of the gear housing 50 to form a sealed gearbox 87. The gear housing 50 may include apertures or extruded bosses 88 similar to those described for the outer and inner tubes 14, 16, and the gear-housing cap 86 may include a plurality of apertures 90. Similar to previous descriptions, the apertures 90 in the gear-housing cap 86 may be aligned with the bosses 88 of the gear housing 50. Fasteners 92, such as bolts, screws, rivets, and the like, may be passed through the apertures 90 and into the bosses 88 so as to secure the cap 86 to the gear housing 50.

In such an arrangement, the gear housing 50 and gear housing cap 86 may serve to maintain the aesthetic continuity of the jack assembly 10. Such arrangements may also simplify components for manufacturability. The base plate 82 of the gear housing 50 may serve as a support plate for the jackscrew 46 positioned within the jack assembly 10. Securing the gear housing 50 and gear-housing cap 86 with fasteners may specifically add strength, support, or rigidity to the coupling of the gear housing 50 to the jack assembly 10, along with general adding strength, support, or rigidity to the jack assembly 10. By forming a sealed gearbox 87, grease may be held within the gearbox 87 and contaminants may be kept out of the gearbox 87. Such an arrangement reduces the need for maintenance of the gearbox 87 over the service life of the gearbox 87 and increases the service life of the jack assembly 10 is generally increased. Specifically, a sealed gearbox 87 increases the service life of internal components positioned within the gearbox 87 such that the service life of the jack assembly 10. The components of a gearbox 87, including the gear housing 50 and gear housing cap 86, may be fabricated or otherwise manufactured from glass-filled nylon or other similar material so as to increase the resistance to corrosion.

The use of fasteners 92 and apertures 88, 90 to secure the gear housing 50 and gear housing cap 86 to the jack assembly 10 increases the alignment precision of the gearbox 87 and the remainder of the jack assembly 10. Such an increase in precision holds the gearbox 87, jackscrew 46, jack nut 48, tubes 14, 16, handle assembly 18, internal gears, and many other components, in alignment, which reduces wear on components, increases efficiency, and increases the service life of the jack assembly 10. In addition, the embodiments as described eliminate the need for additional machining of the gear housing 50 or the use of bushings with the gear housing 50.

Figure 18:
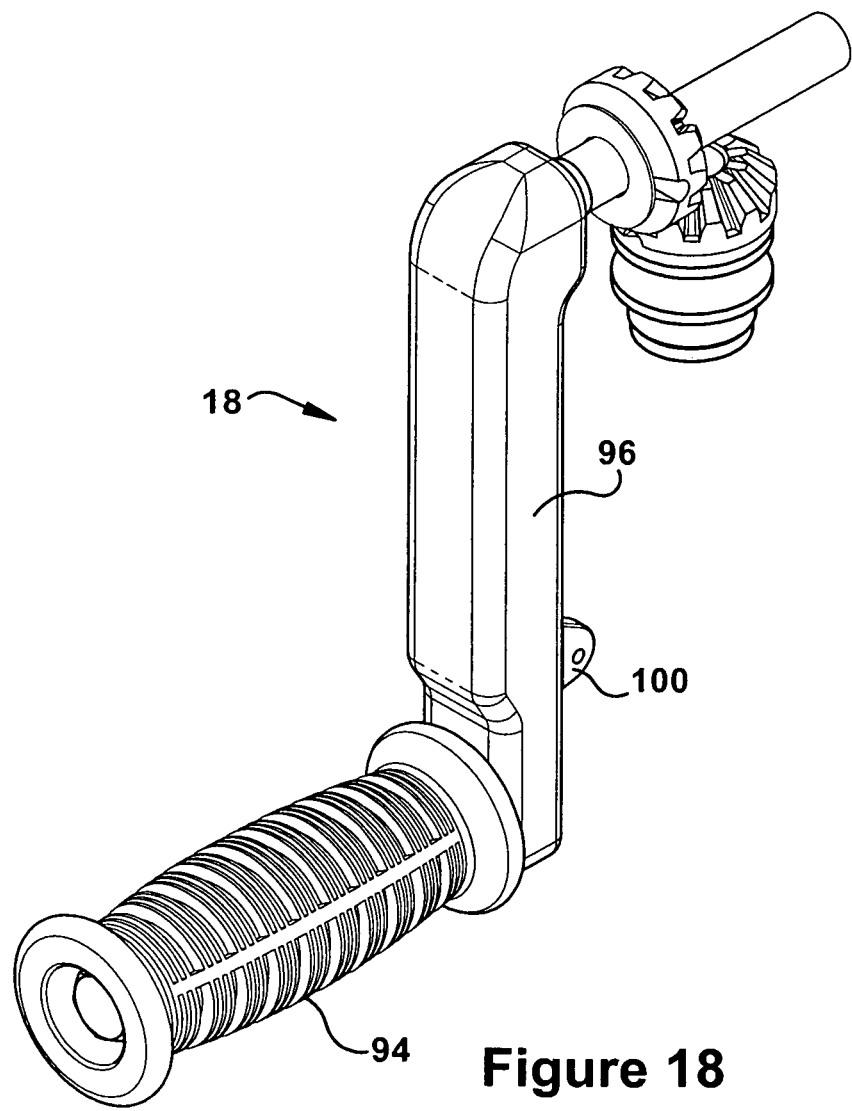
FIG. 18 illustrates a perspective view of a handle assembly of a jack assembly.

The handle assembly 18 engages with the gearbox 87 to raise and lower the jack assembly 10. As seen in FIGS. 3 and 18, the handle assembly 18 includes a grip 94, a crank member 96, and a handle-assembly holder or clip 98. The crank member 96 engages the gears of the gearbox 87 (as seen in FIGS. 4, 13, and 14) to transform rotational motion of the crank 96 into linear motion of the outer tube 14 so as to raise and lower the jack assembly 10. By way of a non-limiting example, the crank member 96 may include a stem portion 97. The stem portion 97 may be inserted into the gear housing 87 such that the stem portion 97 may engage the gears of the gearbox 87. Moreover, the gearbox 87 may include an aperture 101 and a blind bore 103 that may have a closed end at a wall of the gearbox 87, as shown in FIGS. 3 and 4. The aperture 101 and blind bore 103 may be located on opposite walls of the gearbox 87 such that rotation of the handle assembly 18 may transform rotational motion of the crank 96 into linear motion of the outer tube 14. The stem portion 97 may be inserted through the aperture 101 and into the blind bore 103. In these embodiments, the aperture 101 and the blind bore 103 may act as a bushing during rotation of the handle assembly 18 such that additional bearings may not be necessary as previously noted. When a user has placed the jack assembly 10 at the proper height or has placed the jack assembly 10 in a stowed position, the handle assembly 18 may be clamped or otherwise secured to the outer tube 14. Such an arrangement prevents the handle assembly 18 from moving or changing the height of the jack assembly 10 when the jack assembly 10 is in the vertical position. In addition, such an arrangement prevents the handle assembly 18 from dragging on the ground when the jack assembly 10 is in the stowed position.

In one embodiment, the handle assembly 18 may be secured to the outer tube 14 such that the crank 96 is parallel to the outer tube 14 when it is secured. In one embodiment, the handle assembly clip 98 is attached to the crank 96 and arranged to engage the outer tube 14 such that it holds the handle crank 96, and thus the handle assembly 18, parallel to the outer tube 14. The securing of the handle assembly 18 may be facilitated by including a hinge mount to fold the handle assembly 18 out of the way when not in use, i.e., securing the handle assembly 18 to the outer tube 14. In another embodiment, the handle assembly clip 98 may be secured to the outer tube 14 and arranged to clip onto the crank 96 as the handle assembly is folded towards the outer tube 14.

The handle assembly 18 may be arranged to include an operation position and a stowed position. While in the operation position, the crank 96 and handle-assembly clip 98 are positioned such that, when the handle assembly 18 is rotated to raise and or lower the jack assembly 10, the handle-assembly clip 98 does not prevent the crank 96 from rotating. While in the stowed position, the handle-assembly clip 98 clamps to the crank 96 and prevents the crank 96 from rotating.

The handle assembly 18 may also be arranged to enable a non-destructive overload bypass when the handle assembly 18 is improperly engaged or disengaged in the stowed position. Such an arrangement may be facilitated by the use of flexible plastic or other such materials to form a handle assembly 18, particularly the handle assembly clip 98, with a generally flexible construction. The handle-assembly clip 98 may also include a lead-in member 100 that disengages the clip 98 when a user rotates the handle assembly 18 while the handle assembly 18 is secured to the outer tube 14, i.e., the handle assembly 18 is in the stowed position (as best seen in FIGS. 13 and 14).

Figure 19:
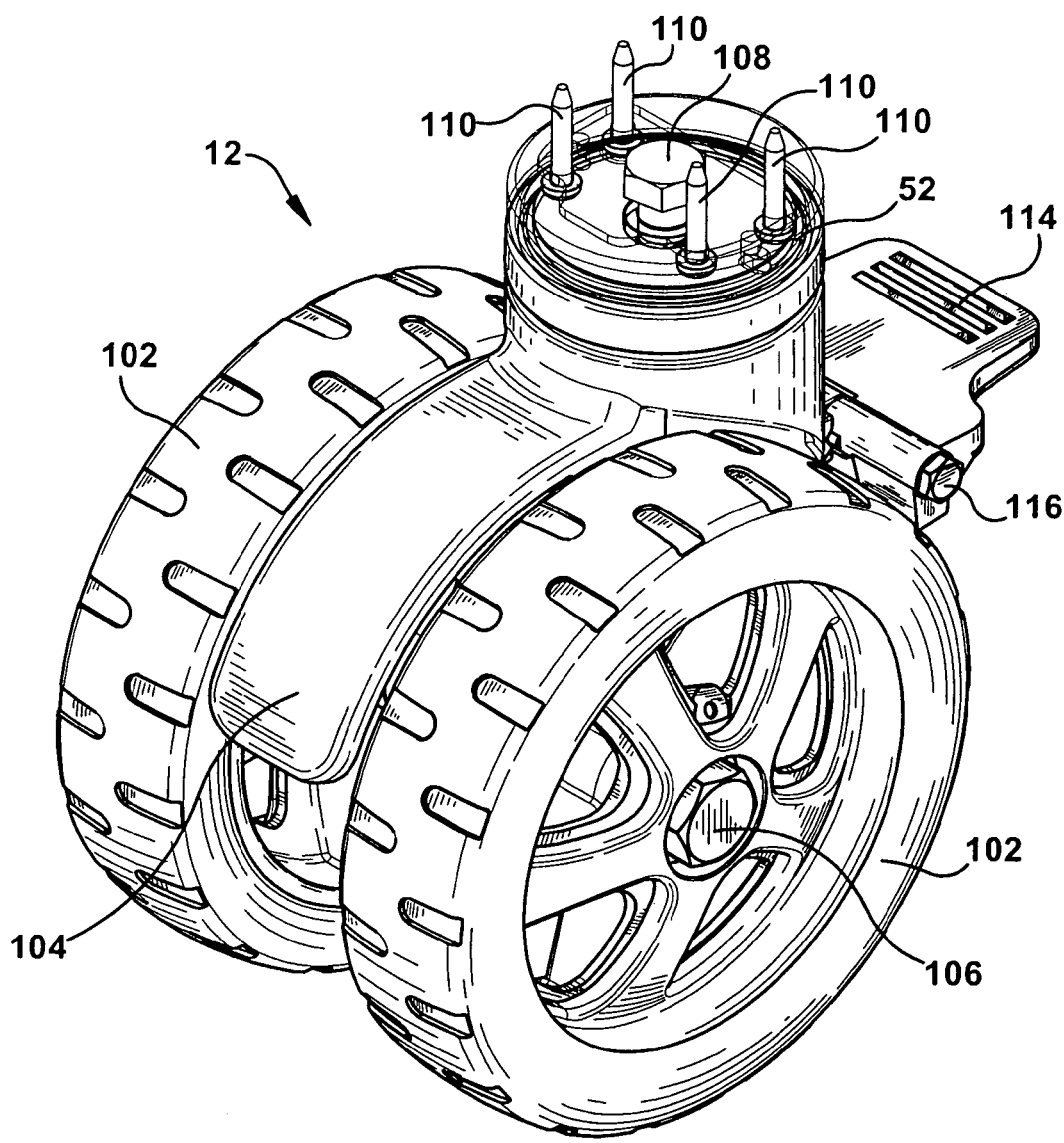
FIG. 19 illustrates a perspective view of a dual wheel caster assembly of a jack assembly.

In one embodiment, the jack assembly 10 includes a dual wheel caster assembly 12. As best seen in FIGS. 3 and 19, the dual wheel caster assembly 12 includes a pair of wheels 102, a yoke 104, a pin 106, and a yoke retainer 52. The pair of wheels 102 are assembled to the yoke 104 by the pin 106. The yoke 102 is coupled to the yoke retainer 52 by a fastener 108. As previously discussed, the yoke retainer 52 may be attached to the lower end 36 of the inner tube 16 by passing a plurality of fasteners 110 through apertures 112 in the yoke retainer 52 and securing those fasteners 110 into the bosses 40 of the inner tube 16. In one embodiment, the arrangement of the dual wheel caster assembly 12 to the inner tube 14 provides for the assembly 12 to swivel or rotate with respect to the inner tube 14.

In one embodiment, each wheel 102 is arranged such that it rotates independently of the other wheel 102. Such an arrangement of the wheels 102 minimizes friction as the assembly 12 swivels with respect to the remainder of the jack assembly 10. In addition, this arrangement maximizes surface area contact between the ground (or other supporting surface) and the wheels 102 while minimizing friction. In one embodiment, the wheels 102 are seven-inch diameter rubber wheels. To reduce or eliminate the need to lubricate the wheel assembly 12, large diameter nylon on stainless steel washer stalks may be used. Such large diameter washers may serve to reduce point loading by offering a greater surface on which to distribute a load.

To further limit friction, the bearing surfaces above and below the mounting surface of the yoke 104 and yoke retainer 52 may be integrated. The use of fasteners 110 to directly secure the wheel assembly 12 to the inner tube 16 results in the yoke retainer 52, jackscrew 46, jack nut 48, inner tube 16, and outer tube 14 being generally held in good alignment. Such good alignment decreases wear and tear on jack assembly 10 components and increases the service life of the jack assembly 10. In addition, good alignment makes it easier to for a user to operate the jack assembly 10.

The dual wheel caster assembly 12 may be fabricated from aluminum, utilizing a die casting process. Such an arrangement provides for a corrosion-resistant assembly 12. To further provide corrosion protection, components of the wheel assembly, along with all components of the jack assembly 10, may be coated with a dichromate coating.

The dual wheel caster assembly 12, as described, maintains the aesthetic continuity of the jack assembly 10 because the attachment method, i.e., using hidden fasteners 110 secured to internal bosses 40 in the inner tube 16, eliminates the need for welds or fasteners that can be seen from outside the jack assembly 10. Such an arrangement provides a stylized interface from the inner tube 16 to the yoke 104. In addition, the method of attachment of the wheel assembly 12 to the inner tube 16 provides for the yoke retainer 52 to abut the lower end 36 of the inner tube 16. Such abutment reduces or eliminates concerns over sharp edges or burrs due to the manufacturing of the inner tube 16, therefore eliminating post-manufacture processes to dull or deburr the edge of the inner tube 16.

As best seen in FIGS. 1 and 19, the wheels 102 are offset a predetermined distance from the centerline of the jack assembly 10. Such an offset allows the wheels 102 to follow in the direction in which the jack assembly 10 is moving. In one example, such an arrangement may facilitate the moving of a towing trailer when the trailer is detached from a towing vehicle and the jack assembly is utilized to support one end of the trailer.

The dual wheel caster assembly 12 may further include a wheel wedge or brake lever 114. The wheel wedge 114 is attached to the yoke 104 by a pin 116. The wheel wedge 114 may be selectively positioned to secure the wheels 102 so as to deter rotation of the wheels 102 while the trailer is stored or otherwise idle. The wheel wedge 114 includes a locked position and an unlocked position. In the locked position, the wheel wedge 114 is rotated downward into contact with the wheels 102. This contact deters any rotation of the wheels 102. In the unlocked position, the wheel wedge 114 is rotated upwards and out of contact with the wheels 102, allowing the wheels 102 to rotate freely.

The wheel wedge 114 may be moved between the locked and unlocked position by a user. In one example, the user may step on the wheel wedge 114 to move it from the unlocked to the locked position. The user may also use his or her foot to kick or lift the wheel wedge 114 upward to move the wedge 114 from the locked position to the unlocked position. Such an arrangement provides an easily utilized and cost effective mechanism for locking and unlocking the wheels 102.

In another embodiment, best seen in FIGS. 2 and 11, a jack assembly 22 is arranged with a single wheel caster assembly 24. The single wheel caster assembly 24 includes a single wheel 118 and a yoke 120 arranged to support a single wheel 118. The wheel 118 is attached to the jack assembly 22 similarly to the description of the attachment of the dual wheel caster assembly 12. The single wheel caster assembly 24 may also include a wheel wedge 114 that can be used to lock and unlock the wheel 118.

The invention has been described above and, obviously, modifications and alterations will occur to others upon a reading and understanding of this specification. The claims as follows are intended to include all modifications and alterations insofar as they come within the scope of the claims or the equivalent thereof.

Having thus described the invention, we claim:

1. A jack assembly for a towed vehicle, the jack assembly comprising:
   a first member;
   a second member telescopingly engaged with said first member, said second member having end portions and a length therebetween;
   a pivot assembly connected to said second member such that no compressive force is applied to said first member and said pivot assembly is capable of mounting to a trailer, wherein said pivot assembly is positionable along at least a portion of said length of said second member; and
   wherein said pivot assembly selectively rotates said first and second members to generally horizontal and vertical positions relative to said trailer independent of said positionability of said pivot assembly on said second member.

2. The jack assembly of claim 1, wherein said pivot assembly includes a pivot housing, a slide block, a pivot block and an attachment bracket for mounting to said trailer.

3. The jack assembly of claim 2, wherein said attachment bracket can be rotated to accommodate trailers having tongues of at least two different heights.

4. The jack assembly of claim 2, wherein said pivot housing rotates relative to said pivot block about a pivot axis.

5. The jack assembly of claim 4, further comprising a pull pin coupled to said pivot housing wherein said pull pin is arranged to selectively lock and unlock said pivot housing relative to said pivot block.

6. The jack assembly of claim 2, wherein a fastener attaches said slide block to said pivot block and said pivot housing.

7. The jack assembly of claim 6, wherein said pivot block and said pivot housing bear loads during rotation of pivot assembly and wherein said fastener is generally free from loads during rotation of said pivot assembly.

8. The jack assembly of claim 2, wherein said first member includes an inner tube and said second member includes an outer tube.

9. The jack assembly of claim 8 further comprising a slot running at least a portion of said length of said outer tube.

10. The jack assembly of claim 9, wherein said pivot assembly is slidably connected in said slot by said slide block wherein said slide block may be positioned at any location along said slot of said outer tube.

11. The jack assembly of claim 10, wherein said slide block is connected to said pivot block.

12. The jack assembly of claim 11, wherein said pivot block and said slide block are arranged to secure said pivot assembly to said outer tube.

13. The jack assembly of claim 9, wherein said slot generally prevents said slide block from pivoting.

14. The jack assembly of claim 1, wherein said pivot assembly is positionable along an entirety of said length between said end portions of said second member.

15. A jack assembly for a towed vehicle, the jack assembly comprising:
   a first tube and having a cross-sectional shape;
   a second tube telescopingly engaged with said first tube;
   telescoping mechanism operatively coupled with said first and second tubes, wherein said telescoping mechanism telescopingly positions said first tube relative to said second tube; and
   a first bushing having a generally corresponding shape as said cross-sectional shape of said first tube, wherein said first bushing is attached to said first tube and positioned between said first and second tubes such that said first and second tubes do not contact during telescoping of said first and second tubes.

16. The jack assembly of claim 15 further comprising a second bushing attached to said second tube and positioned between said first and second tubes such that said first and second tubes do not contact during telescoping of said first and second tubes.

17. The jack assembly of claim 16, wherein said second bushing is secured to a lower end of said second tube such that a portion of said second bushing is positioned between said first and second tubes.

18. The jack assembly of claim 17, wherein said second bushing includes an opening to accommodate said first tube.

19. The jack assembly of claim 16, wherein attaching said first bushing and said second bushing to their respective tubes maintains axial alignment of said first and second tubes.

20. The jack assembly of claim 16, further comprising a jack nut wherein said jack nut is attached to said first bushing.

21. The jack assembly of claim 16, wherein said second tube includes a cross-sectional shape and wherein said second bushing has a generally corresponding shape as said cross-sectional shape of said second tube.

22. The jack assembly of claim 15, wherein said first bushing is secured to an upper end of said first tube such that a portion of said first bushing is positioned between said first and second tubes.

23. A jack assembly for a towed vehicle, the jack assembly comprising:
   an inner tube;
   an outer tube telescopingly engaged with said inner tube;
   a gear housing located adjacent an upper end of said outer tube, wherein said gear housing includes an aperture extending through an outer wall of said gear housing and a blind bore;
   a handle assembly having a crank member and a stem attached to said crank member, wherein said stem is inserted through said aperture and into said blind bore of said gear housing wherein rotation of said handle assembly causes said outer tube to move telescopically relative to said inner tube; and
   wherein said aperture and blind bore act as a bushing during rotation of said handle assembly.

24. The jack assembly of claim 23, wherein said gear housing includes a cap secured to a top portion of said gear housing to form a sealed gearbox.

25. The jack assembly of claim 23, wherein said handle assembly further includes a clip to secure said handle assembly in a generally parallel position to said outer tube and to prevent said handle from rotating when in a stowed position.

26. The jack assembly of claim 23, wherein said aperture and blind bore are positioned on opposite walls of said gear housing.

27. A jack assembly for a towed vehicle, the jack assembly comprising:
   a first member;
   a second member telescopingly engaged with said first member, said second member having end portions and a length therebetween;

a slot positioned on said second member and running at least a portion of said length of said second member;

a pivot assembly having a pivot housing, a slide member, and a pivot member wherein said slide member is positioned within said slot of said second member, wherein said pivot assembly is positionable along at least a portion of said slot; and wherein said pivot assembly selectively rotates said first and second members to generally horizontal and vertical positions relative to said trailer independent of said positionability of said pivot assembly on said slot.

* * * * *